US011918107B2

(12) United States Patent
Doherty et al.

(10) Patent No.: US 11,918,107 B2
(45) Date of Patent: Mar. 5, 2024

(54) FOLDABLE CABINET

(71) Applicant: Armadillo Tough LLC, Boynton Beach, FL (US)

(72) Inventors: Robert Doherty, Boynton Beach, FL (US); Aaron Diamond, Boynton Beach, FL (US)

(73) Assignee: Armadillo Tough LLC, Boynton Beach, FL (US)

( * ) Notice: Subject to any disclaimer, the term of this patent is extended or adjusted under 35 U.S.C. 154(b) by 0 days.

(21) Appl. No.: 17/554,015

(22) Filed: Dec. 17, 2021

(65) Prior Publication Data

US 2023/0189985 A1 Jun. 22, 2023

(51) Int. Cl.
*A47B 43/00* (2006.01)
*E05D 3/06* (2006.01)
*E05D 3/12* (2006.01)

(52) U.S. Cl.
CPC ................ *A47B 43/00* (2013.01); *E05D 3/12* (2013.01)

(58) Field of Classification Search
CPC ......... A47B 43/00; A47B 83/045; E05D 3/12; E05D 15/264; B62B 3/02; B25H 3/00; B25H 1/04
See application file for complete search history.

(56) References Cited

U.S. PATENT DOCUMENTS 889,741 A * 6/1908 Additon ................. A47B 43/00 312/258
2,934,389 A * 4/1960 Krey ...................... A47B 43/02 312/262
3,294,464 A * 12/1966 Lew ....................... A47B 43/02 312/258
5,533,799 A * 7/1996 Nickolaus, Jr. .......... B25H 1/12 312/249.4
6,948,787 B2 * 9/2005 McBrayer, III ........ A47B 43/00 312/258
9,301,603 B1 * 4/2016 Koehn ................... A47B 47/00
9,816,303 B2 * 11/2017 Lee ......................... E05D 11/06
11,206,922 B2 * 12/2021 Hermann ............... A47B 67/00
2004/0150302 A1 * 8/2004 McBrayer, III ........ A47B 43/00 312/258
2007/0210682 A1 * 9/2007 Wise ...................... A47B 87/00 312/108
2017/0268266 A1 * 9/2017 Lee ......................... E05D 11/06
2020/0178686 A1 * 6/2020 Hermann ............... A47B 31/00

FOREIGN PATENT DOCUMENTS

KR 20010090221 A * 10/2001

* cited by examiner

*Primary Examiner* — Kimberley S Wright
(74) *Attorney, Agent, or Firm* — Akerman LLP; Ryan Harding

(57) ABSTRACT

A cabinet may include a front wall attached to a front proximal supporting leg and a front distal supporting leg, a back wall attached to a back proximal supporting leg and a back distal supporting leg, a first foldable side wall attached to the front proximal supporting leg and the back proximal supporting leg, and a second foldable side wall attached to the front distal supporting leg and back distal supporting leg. The first foldable wall may include a first panel connected to a second panel by at least a first double pivot connection, and the second foldable wall may include a third panel connected to a fourth panel by at least a second double pivot connection.

19 Claims, 13 Drawing Sheets

FOLDABLE CABINET

TECHNICAL FIELD

The present application is directed to cabinets, and more specifically to foldable cabinets.

BACKGROUND

Storage cabinets are typically bulky units where the underlying structure (e.g., the cabinet walls) have a fixed size. These storage cabinets are time consuming to assemble and are cumbersome to maneuver and transport.

SUMMARY

In one embodiment, a cabinet may include a front wall attached to a front proximal supporting leg and a front distal supporting leg, a back wall attached to a back proximal supporting leg and a back distal supporting leg, a first foldable side wall attached to the front proximal supporting leg and the back proximal supporting leg, and a second foldable side wall attached to the front distal supporting leg and back distal supporting leg. The first foldable wall may include a first panel connected to a second panel by at least a first double pivot connection, and the second foldable wall may include a third panel connected to a fourth panel by at least a second double pivot connection.

In one aspect, the first double pivot connection comprises a first pivot connected to a first side of a first connector and a second pivot connected to a second side of the first connector. The second double pivot connection may include a first pivot connected to a first side of a second connector and a second pivot connected to a second side of the second connector.

In one aspect, the first pivot of the first double pivot connection connects to the first panel of the first foldable wall and a second side of the first double pivot connection connects to the second panel of the first foldable wall, and wherein a first side of the second double pivot connection connects the third panel of the of the second foldable wall and a second side of the second double pivot connection connects to the fourth panel of the second foldable wall.

In one aspect, the first panel attaches to the front proximal supporting leg by a first pivot mechanism, the second panel attaches to the back proximal supporting leg by a second pivot mechanism, the third panel attaches to the front distal supporting leg by a third pivot mechanism, and fourth panel attaches to the back distal supporting leg by a fourth pivot mechanism.

In one aspect, the first double pivot connection enables inward rotation of the first and second panel of the first foldable wall such that the first and second panel are approximately parallel when in a folded configuration. The second double pivot connection may enable inward rotation of the third and fourth panel of the second foldable wall such that the third and fourth panels are approximately parallel when in the folded configuration.

In one aspect, the front wall and the back wall are approximately parallel when the first foldable wall and second foldable wall are in the folded configuration.

In one aspect, a first pivot mechanism is positioned on the first panel and is offset a first distance from the front proximal supporting leg, a second pivot mechanism is positioned on the second panel and is offset a second distance from the back proximal supporting leg, a third pivot mechanism is positioned on the third panel and is offset a third distance from the front distal supporting leg, and a fourth pivot mechanism is positioned on the fourth panel and offset by a fourth distance from the back distal supporting leg.

In one aspect, each of the front proximal supporting leg, back proximal supporting leg, front distal supporting leg, and back distal supporting leg each have a vertically aligned attachment mechanism configured to support at least one removable shelf by a plurality of pins extended outward from the removable shelf.

In one aspect, a drawer has a proximal bracket removably attached to the front proximal supporting leg and the back proximal supporting leg, and a distal bracket removably attached to the front distal supporting leg and back distal supporting leg.

In one aspect, the first panel and second panel are connected by a plurality of double pivot connections, and the third panel and fourth panel are connected by a plurality of double pivot connections.

In one embodiment, the foldable cabinet includes a front wall attached to a front proximal supporting leg and a front distal supporting leg, a back wall attached to a back proximal supporting leg and a back distal supporting leg, a first foldable side wall attached to the front proximal supporting leg and the back proximal supporting leg, and a second foldable side wall attached to the front distal supporting leg and back distal supporting leg. The first foldable wall may include a first panel connected to a second panel by at least a first double pivot connection, and the second foldable wall may include a third panel connected to a fourth panel by at least a second double pivot connection. The method for folding the foldable cabinet may include applying pressure to an external portion of the first panel or second panel such that the first panel and second panel rotate inward and are approximately parallel when in a folded configuration. The method may further include applying pressure to an external portion of one of the third panel or fourth panel such that the third panel and fourth panel rotate inward and are approximately parallel when in a folded configuration.

In one aspect, the first double pivot connection comprises a first pivot connected to a first side of a first connector and a second pivot connected to a second side of the first connector. The second double pivot connection comprises a first pivot connected to a first side of a second connector and a second pivot connected to a second side of the second connector.

In one aspect, first pivot of the first double pivot connection connects to the first panel of the first foldable wall and a second side of the first double pivot connection connects to the second panel of the first foldable wall, and wherein a first side of the second double pivot connection connects the third panel of the of the second foldable wall and a second side of the second double pivot connection connects to the fourth panel of the second foldable wall.

In one aspect, the first panel attaches to the front proximal supporting leg by a first pivot mechanism, the second panel attaches to the back proximal supporting leg by a second pivot mechanism, the third panel attaches to the front distal supporting leg by a third pivot mechanism, and the fourth panel attaches to the back distal supporting leg by a fourth pivot mechanism.

In one aspect, the front wall and the back wall are approximately parallel when the first foldable wall and second foldable wall are in the folded configuration.

In one aspect, a first pivot mechanism is positioned on the first panel and is offset a first distance from the front proximal supporting leg, a second pivot mechanism is positioned on the second panel and is offset a second distance from the back proximal supporting leg, a third pivot mechanism is positioned on the third panel and is offset a third distance from the front distal supporting leg, and a fourth pivot mechanism is positioned on the fourth panel and offset by a fourth distance from the back distal supporting leg.

In one aspect, each of the front proximal supporting leg, back proximal supporting leg, front distal supporting leg, and back distal supporting leg each have a vertically aligned attachment mechanism configured to support at least one removable shelf by a plurality of pins extended outward from the removable shelf.

In one aspect, a drawer has a proximal bracket removably attached to the front proximal supporting leg and the back proximal supporting leg, and a distal bracket removably attached to the front distal supporting leg and back distal supporting leg.

In one aspect, the first panel and second panel are connected by a plurality of double pivot connections, and the third panel and fourth panel are connected by a plurality of double pivot connections.

BRIEF DESCRIPTION OF THE DRAWINGS

Novel features of the present invention are set forth with particularity in the appended claims. However, various embodiments of the present invention described herein, both as to organization and manner of operation, may be best understood by reference to the following description, taken in conjunction with the accompanying drawings in which:

DETAILED DESCRIPTION

Figure 1:
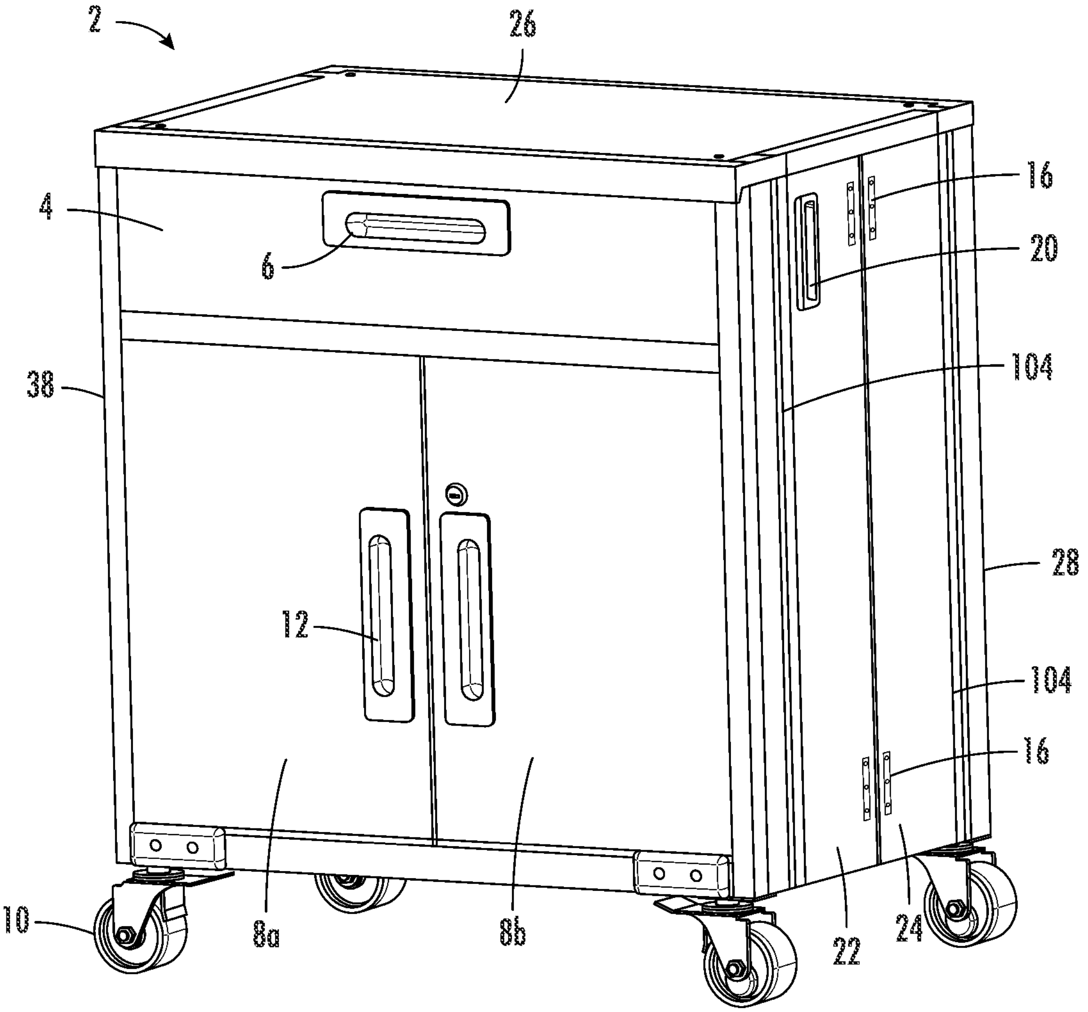
FIG. 1 illustrates a frontal view of the outside of the foldable cabinet according to one embodiment.

An improved cabinet includes foldable side walls. The foldable side walls significantly reduces the volume of the storage unit, making it more convenient to transport. Additionally, the foldable side walls significantly reduce assembly time because the storage cabinet can be quickly assembled by unfolding the walls. Folding the cabinet into a compact folded configuration also reduces required shipping space and costs, thereby benefiting consumers, sellers, and shippers.

FIGS. 1-9 illustrate a foldable cabinet according to various embodiments of the present disclosure wherein like numbers identify like features.

With reference to FIGS. 1-4, foldable cabinet 2 may include various cabinet features such as a top panel 26, cabinet doors 8*a*, 8*b*, one or more drawers 4, or the like. As shown, the foldable cabinet 2 includes an optional top drawer 4 including a handle 6, and the two front cabinets doors 8*a*, 8*b*, also including handles 12*a*, 12*b*, respectively. In some embodiments, the foldable cabinet 2 may also include wheels 10 attached along a bottom portion of foldable cabinet 2.

The foldable cabinet 2 is configured to be foldable to reduce the volume occupied by the cabinet for convenient shipping, assembly, disassembly, and storage. For example, the foldable cabinet 2 may be configured to be folded into a folded position (see, e.g., FIGS. 5*b*-5*e*) and unfolded into an unfolded position (see, e.g., FIGS. 1-3). The foldable cabinet 2 may include foldable side walls 28, 38. In the illustrated embodiment, each side wall 28, 38 includes an optional handle 20 to assist a user in obtaining sufficient grip to manipulate a location of the cabinet 2. The foldable side walls 28, 38 may be positioned opposite each other to allow the cabinet 2 to fold, thereby reducing the volume of space occupied by the cabinet 2 for convenient shipping and storage.

Foldable side wall 28 comprises a side panel 22 connected to a side panel 24 by a double pivot 42. The double pivot 42 may include pivots 60, 62 connected by a connector. The connector is obscured in the illustrated embodiment by a cover 54. The pivots 60, 62 are spaced apart laterally by the connector. The connector of the double pivot 42 is pivotably connected to each side panel 22, 24 by the respective pivots 60, 62. The pivots 60, 62 connect to side panels 22, 24 along inner lateral portions thereof. The pivots 60 are preferably positioned along an interior side of the side panels 22, 24 as to be obscured from view during use and to allow exterior sides of side panels 22, 24 to more closely approximate in the folded position. However, in some embodiments, the double pivot 42 may pivotably attach to side panels 22, 24 alone exterior sides such that pivots 60, 62 position exteriorly.

Figure 2:
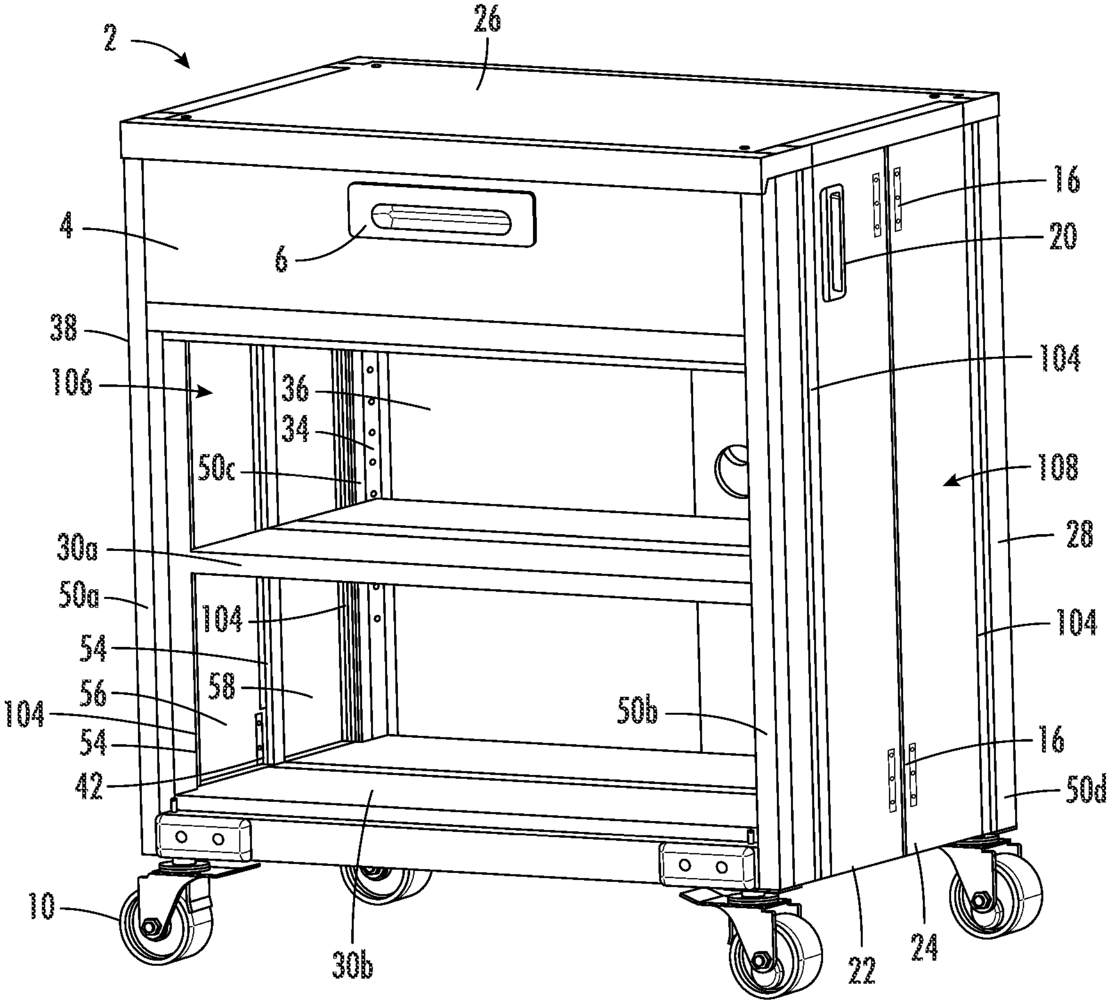
FIG. 2 illustrates a frontal view of the inside of the foldable cabinet without the front cabinet doors according to one embodiment.

As introduced above, the double pivot 42 may include a pivotable connection with each panel 22, 24 about pivots 60, 62. The pivots 60, 62 may comprise a hinged connection such as a pivot hinge, barrel hinge, piano hinge, butt hinge, overlay hinge, concealed hinge, ball bearing hinge, or other suitable pivot structure that allows the respective panel 22, 24 to pivot relative to the double pivot 42, which will typically also result in the panels 22, 24 moving relative to each other. In FIGS. 1 and 2, inner lateral portions of side panels 22, 24 are shown in partial ghost and connection points 16 are shown corresponding to locations of connection of the pivots 60, 62. While two double pivots 42 are identified on each side (see also FIG. 5*a*), additional or fewer double pivots 42 may be used. In various embodiments, the length of the respective pivots along the inner lateral portions of the side panels 22, 24 may span all or a portion of the height of the side panels 22, 24.

The outer lateral portions of the side panels 22, 24 are also pivotably connected to support legs 50*b*, 50*d*, which may include outer lateral portions of side wall 28. For example, a pivot 104 may be provided with respect to each side panel 22, 24 that allows pivoting of the side panels 22, 24 interiorly towards a folded position and exteriorly to the unfolded position. Pivots 104 provide a hinged connection between outer lateral portions of the side panels 22, 24 and legs 50*d*, 50*d*, which may include outer lateral portions of the side wall 28. The pivots 104 may comprise a pivot hinge, barrel hinge, piano hinge, butt hinge, overlay hinge, concealed hinge, ball bearing hinge, or other suitable pivot structure that allows the respective panel 22, 24 to pivot relative legs 50*b*, 50*d*. In one embodiment, the outer portions of panel 22, 24 each include a pin slot that meshes with a pin slot along the legs 50*b*, 50*d* to form a combined vertical slot. A pin may be extended through the combined vertical slot to provide pivot 104. In the embodiment illustrated in FIG. 6*a*, two pivots 104 are provided along the outer portions of each panel 56, 58 and the respective adjacent legs 50*a*, 50*c*. The pivots 104 include pin slots attached to each panel 56, 58 and leg 50*a*, 50*c* that vertically align to receive a pin about which the panels 56, 58 may pivot relative to the adjacent legs 50*a*, 50*c*.

Double pivot 42 and pivots 104 are configured such that pressure on the exterior portion 108 of one of the side panel 22 or side panel 24 cause the pivots 104 and double pivot 42 to rotate inward along a vertical access such that the side panels 22, 24 fold into each other, or in some embodiments, the side panel 22 folds into side panel 24 panel (or vice versa). According to some embodiments, the rotation of the side panels could alternatively result in side panels 22, 24 being approximately or fully parallel, or approximately or fully flush against each other. According to some embodiments, the panels could partially touch, may be approximately or fully parallel with a small gap between the side panels 22, 24, or some combination thereof.

Figure 3:
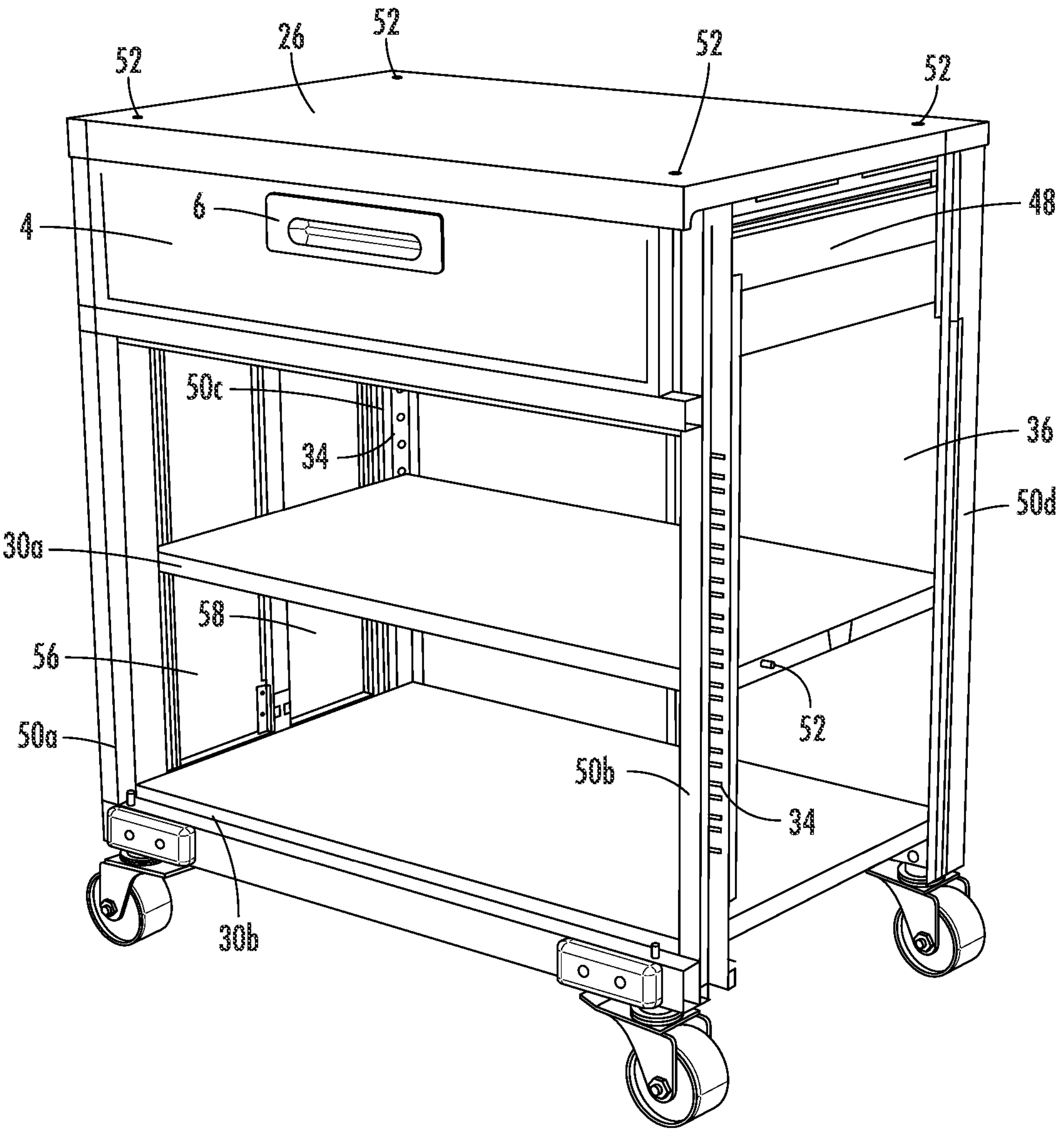
FIG. 3 illustrates a frontal view of the inside of the foldable cabinet according to one embodiment.

FIGS. 2 and 3 illustrate a frontal view of foldable cabinet 2 without the two front cabinet doors 8*a*, 8*b*, or the side wall 28. With reference to FIG. 2, side wall 38 has substantially similar functions and features as side wall 28. For example, side wall 38 includes two panels 56, 58 configured to fold interiorly from an unfolded position to a folded position. The panels 56, 58 are connected along adjacent inner lateral portions by one or more double pivot 42 connections. Outer lateral portion s of the side panels 56, 58 are connected to respective supporting legs 50*a*, 50*c*, which in some embodiments may include a portion of side wall 38, via respective pivots 104. The double pivot 42 includes pivots 60, 62 that are connected by a connector, which is obscured from view in the illustrated embodiment by cover 54. Double pivot 42 enables side panels 56 and 58 to rotate inward about a vertical axes. The connector of the double pivot 42 that pivotably connects to each of side panels 56, 58 via respective pivots 60, 62 couples the pivoting action of the side panels 56, 58 to assist in maintaining alignment during folding and unfolding.

With reference to FIG. 3, the interior portion of foldable cabinet 2 may be configured to support one or more shelves 30*a*, 30*b*. The shelves 30*a*, 30*b* may be removably attached to the supporting legs 50 or elsewhere by adjustable pins 52 that are inserted to an attachment bracket 34 positioned vertically along each of the supporting legs 50. Other attachment mechanisms known to those skilled in the art can also be employed. Although not illustrated, attachment mechanism 34 is also positioned between the side wall 28 and back wall 36, between the side wall 38 and front door 8*a*, and between side wall 28 and front door 8*b*.

Top panel 26 is removably attached to the top of foldable cabinet 2 by pins 52, or other attachment mechanisms known to those skilled in the art. Top drawer 4 is removably attached to supporting legs 50*b*, 50*d* of foldable cabinet 2 via bracket 48. Although not illustrated in FIG. 3, a second bracket with substantially similar functions and features removably attaches the top drawer 4 to the supporting legs 50*a*, 50*c*. Foldable cabinet 2 further includes a back wall 36 that attaches to the two back supporting legs 50*c*, 50*d* and substantially covers the entire back portion of foldable cabinet 2.

Figure 4:
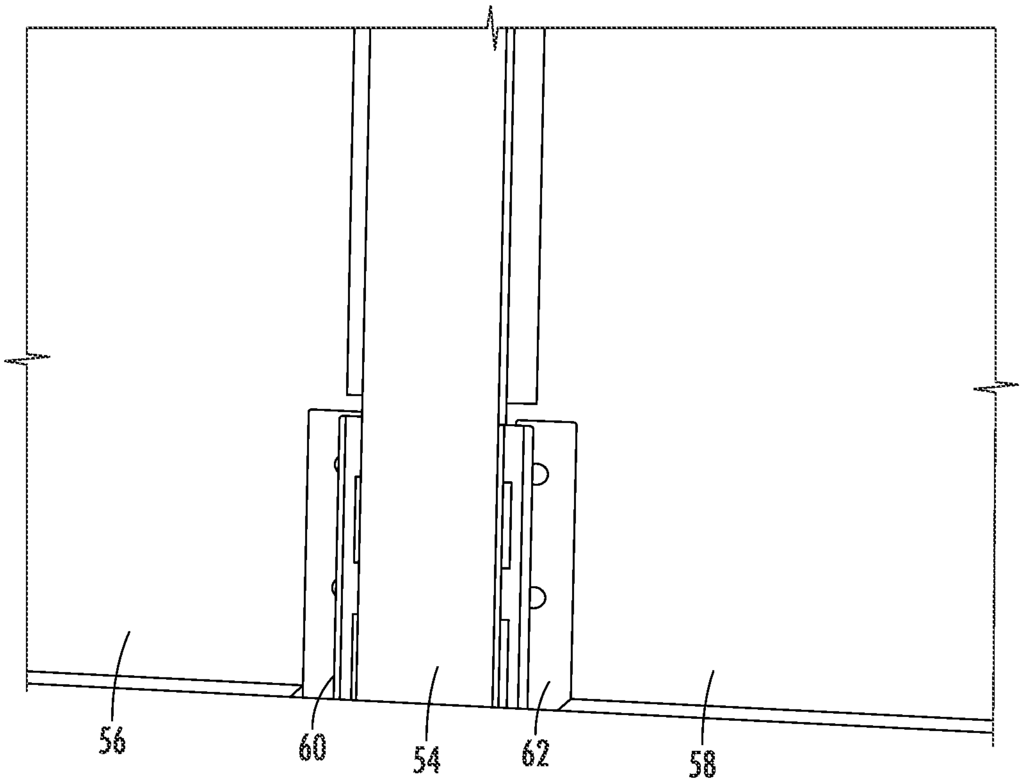
FIG. 4 illustrates a close-up view of a double pivot according to one embodiment.

FIG. 4 provides a close-up of double pivot 42, which comprises a first and second pivot 60, 62. First pivot 60 connects cover 54 to side panel 56 and second pivot 62 connects side panel 58 to cover 54 of side wall 38. Double pivots 42 employed on both side wall 28 and 38 have the substantially similar functions and features.

Figure 5A:
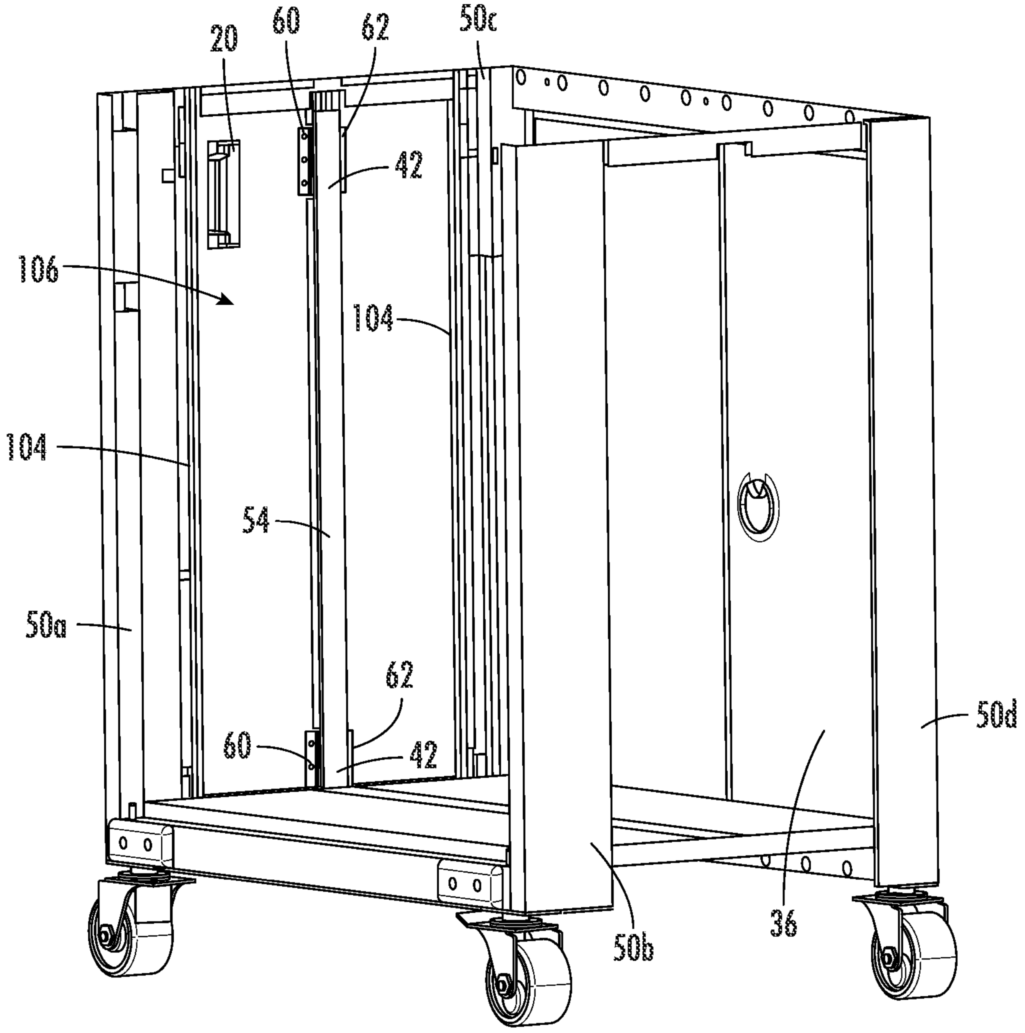
FIG. 5*a* illustrates a frontal view of the inside of the foldable cabinet without one side wall, top drawer, or top panel according to one embodiment.

With reference to FIG. 5*a*, the side walls 28, 38 may include one or more double pivots 42 positioned at various locations along the height of the side walls 28, 38 configured to support the pivoting of the side panels 22, 24, 56, 58 between folded and unfolded positions. Side walls 28, 38 may also include one or more pivots 104 pivotably connecting the same to supporting legs 50*a*, 50*c*. In some embodiments, anchoring structures may be provided along the back wall 66 to anchor the cabinet during use.

Figure 5B:
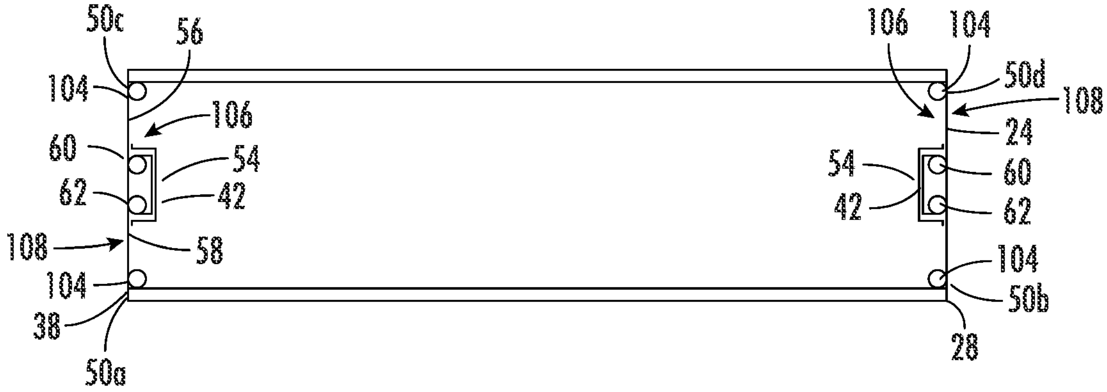
FIG. 5*b* illustrates a top prospective view of the foldable cabinet in an unfolded configuration according to one embodiment.
Figure 5C:
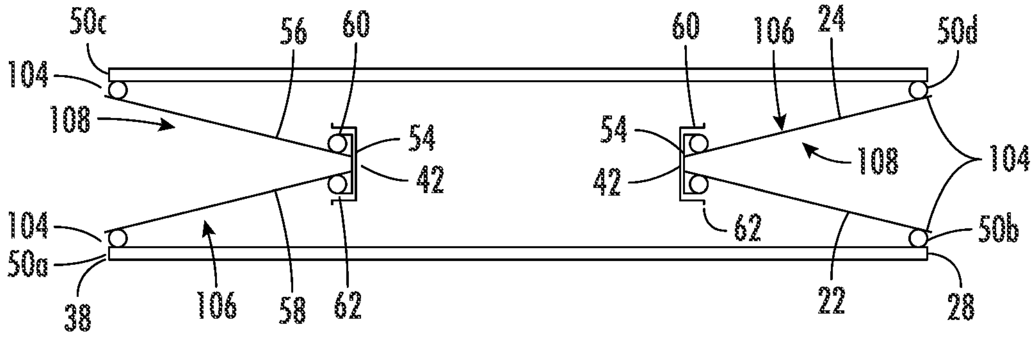
FIG. 5*c* illustrates a top prospective view of the foldable cabinet in a partially folded configuration according to one embodiment.
Figure 5D:
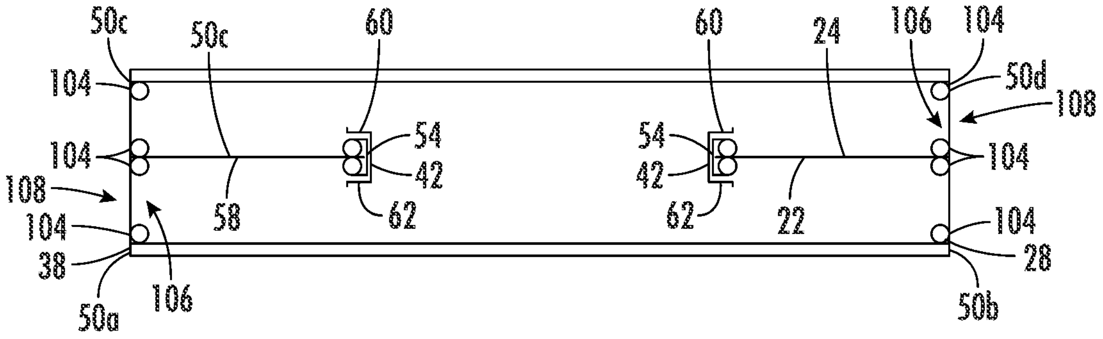
FIG. 5*d* illustrates a top prospective view of the foldable cabinet in a folded configuration according to one embodiment.

With reference to FIGS. 5*b*-5*d*, double pivots 42 comprising first pivot 60 and second 62 are positioned within the interior portion 106 of the cabinet, attached along the interior faces of the side panels 56 and 58. First and second pivot 60, 62 may be positioned within or positioned adjacent cover 54. The illustrated cover 54, which is optional, includes side portions that extending toward the interior portions of the side panels 56, 58, 22, 24. The side portions may further include outwardly extending flanges that extend from the side portions to position flush with the interior portions 106 of the side panels 56, 58, 22, 24. Additionally, pivots 104 are connected between the supporting legs 50*a*-50*d* and the interior portion 106 of each of the side panels 56, 58, 22, 24. Pressure on the exterior portion 108 of one of side panels 56, 58, 22, 24 cause pivots 104 and double pivot 42 to rotate inward such that respective panels 56, 58, 22, 24 pivot toward interiorly, and towards each other. With reference to FIG. 5*d*, when in the folded position, the exterior portion 108 of side panels 56, 58, 22, 24 may be approximately or fully parallel to one another, or approximately or fully flush against each other. In some embodiments, when in the folded position, side panels 56, 58, 22, 24 may only partially touch each other, or there may be a small pocket of space between the exterior portion 108 of side panels 22, 24, 56, 58, or some combination thereof. In some embodiments, respective side panels 56, 58, 22, 24 may fold inwardly and position relative to one another at non-parallel angles, e.g., greater than 5 degrees, such as between 5 degrees and 90 degrees, 5 degrees and 45 degrees, or 5 degrees and 15 degrees. In some embodiments, the angle may be taken from a vertex corresponding to the area of the double pivot. In another embodiment, the angle may be taken from a vertex corresponding to the pivots 104 along the side wall that position adjacent to one another when the respective side panels 22, 24 and 56, 58 are in the folded position, e.g., when a sufficient lateral offset distance is provided between the respective pivots 60, 62 of the double pivot 42.

Figure 5E:
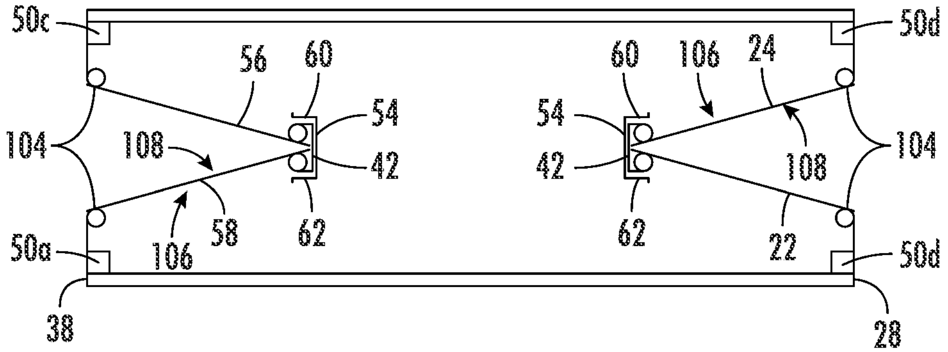
FIG. 5*e* illustrates a top prospective view of the foldable cabinet in a partially folded configuration wherein the side pivots are offset a distance from the supporting legs of the front and back walls according to one embodiment.

With reference to FIG. 5*e*, pivots 104 may be offset a distance on the side walls 28 and 38 from supporting legs 50*a*-50*d* to provide ample room for side panels 22, 24, 56, 58 to pivot into the folded position. When in the folded position, the exterior portion 108 of side panels 56, 58, 22, 24 may be approximately or fully parallel to one another, or approximately or fully flush against each other. According to some embodiments, when in the folded position, side panels 56, 58, 22, 24 may only partially touch each other, or a small pocket of space may be provided between the exterior portion 108 of side panels 22, 24, 56, 58, or some combination thereof. According to some embodiments, double pivots 42 may be positioned within cover 54 or adjacent cover 54, and other embodiments may not include cover 54. As introduced above, according to some embodiments, pivots 60, 62 of double pivot 42 may be offset a lateral distance from one another by a connector 110. The offset lateral distance may form a pocket or space therebetween to allow the adjacent inner edges of panels 22, 24 and panels 56, 58 to pivot interiorly such that the exterior faces may position approximately parallel or flush against each other. Additionally or alternatively, the pivot connector 110 connecting the pivots 60, 62 may be offset interiorly from the pivots 60, 62 providing an exteriorly facing pocket through which the adjacent inner edges of panels 22, 24 and panels 56, 58 may translate into while pivoting to the folded position.

Figure 6A:
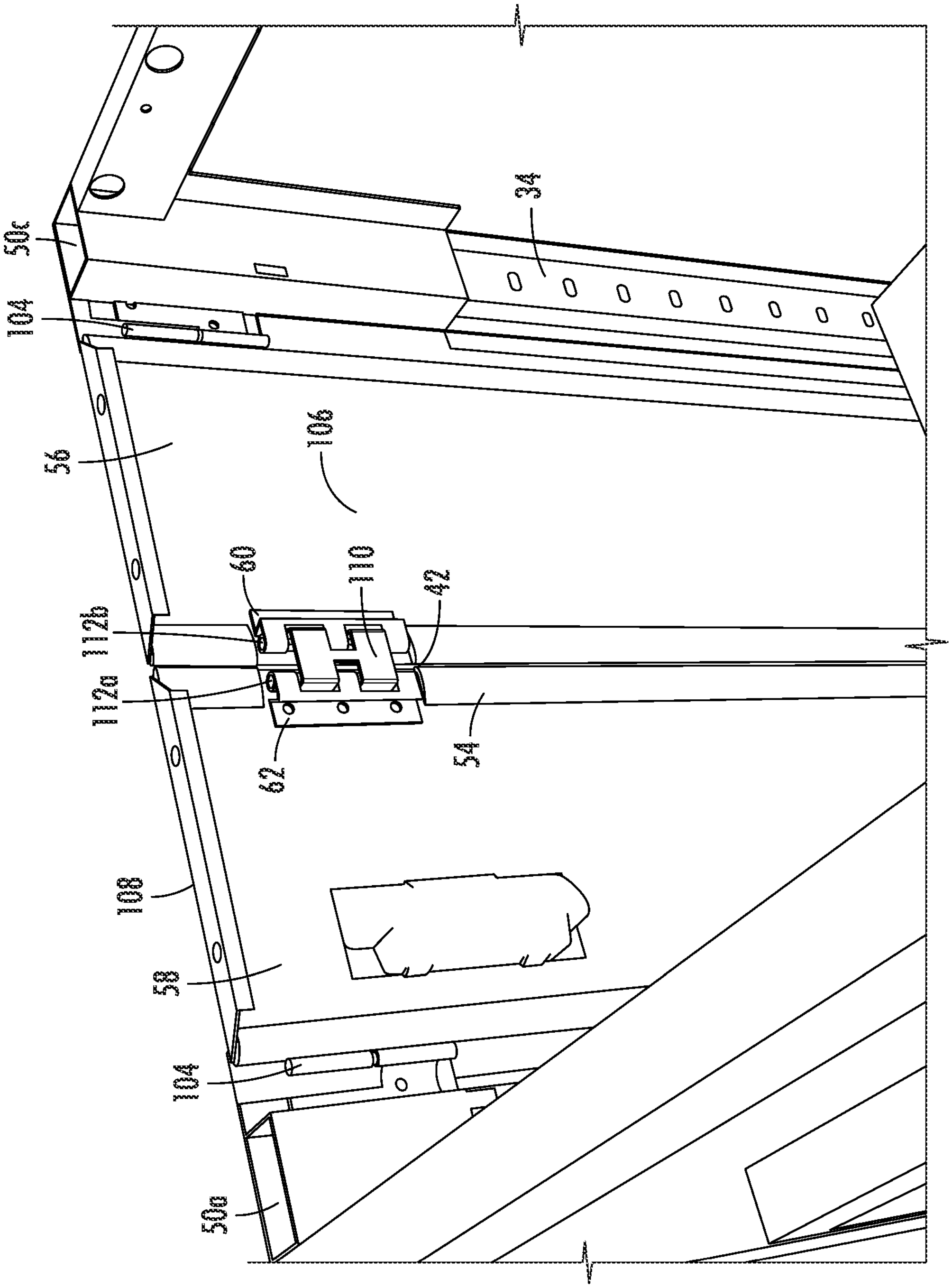
FIG. 6*a* illustrates an inside view of the side wall of the foldable cabinet, according to one embodiment.
Figure 6B:
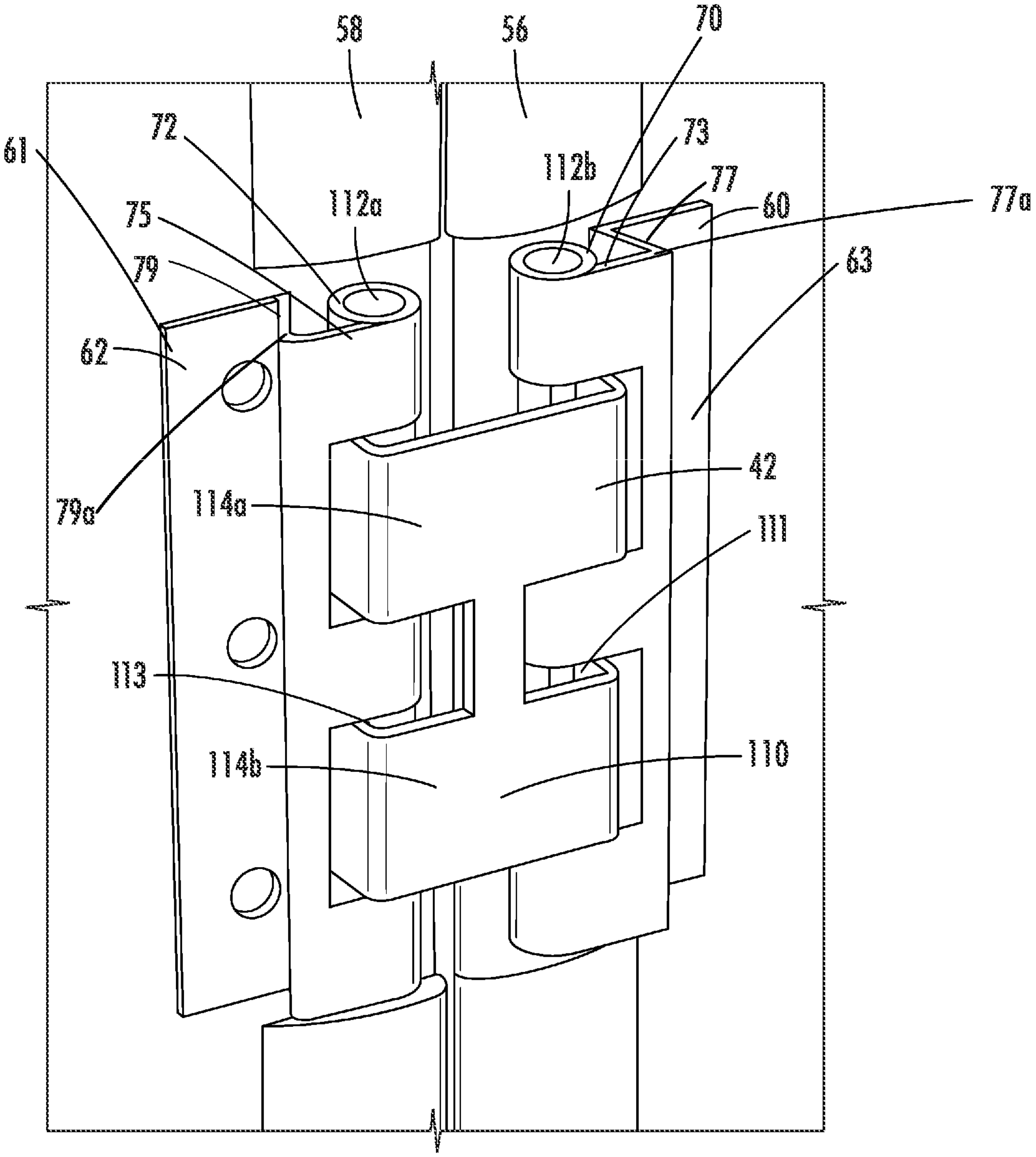
FIG. 6*b* illustrates a double pivot according to one embodiment.
Figure 6C:
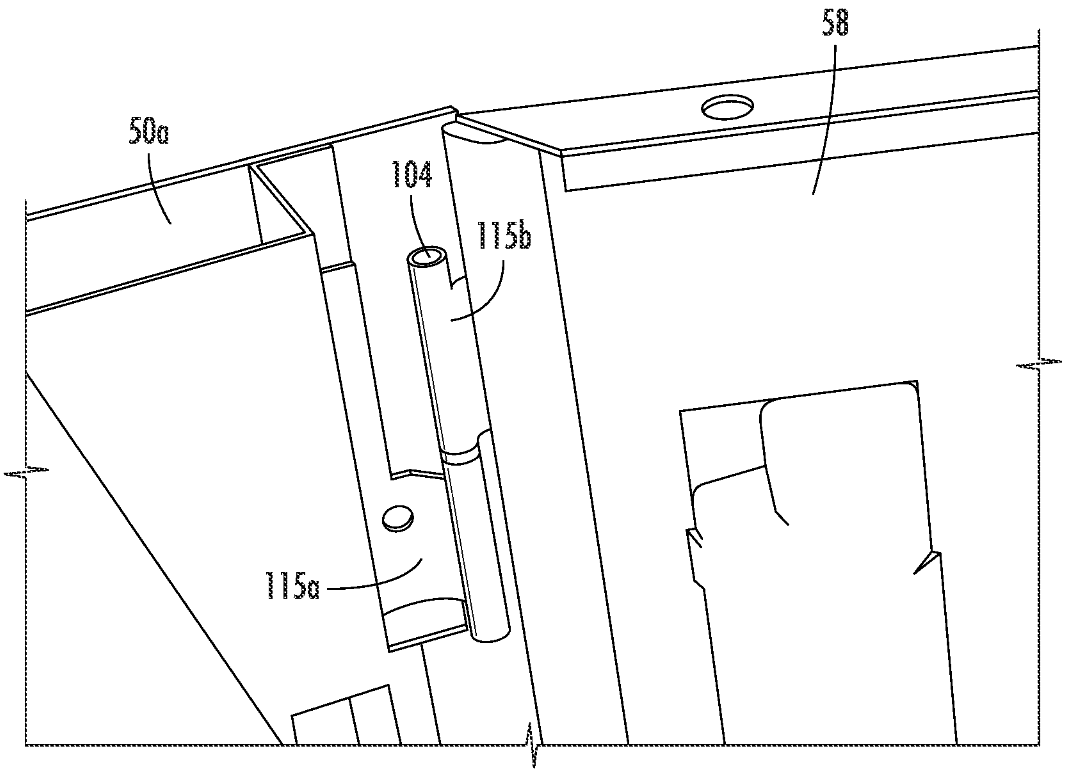
FIG. 6*c* illustrates a pivot according to one embodiment.

FIGS. 6*a*-6*c* illustrate a foldable cabinet according to one embodiment. Double pivot 42 can include pivots 60, 62 positioned on the interior portion 106 of panels 56, 58. Pivots 60, 62 may each include an interiorly extending portion 77, 79. Pivots 60, 62 may each include a laterally extending portion 73, 75 positioned between the interiorly extending portion 77, 79 and a pivot knuckle 70, 72 that extends from an interior end 77*a*, 79*a* of the interiorly extending portion 77, 79 to the respective pivot knuckle 70, 72. The pivots 60, 62 may also include a laterally extending portions 61, 63 that mount to panels 56, 58 and from which the interiorly extending portions 77, 79 extend. Double pivot 42 further includes pivot connector 110 which connects pivot 60 of panel 56 to pivot 62 of panel 58. According to one embodiment, the outer portion of panels 56, 58 each include a pin slot that meshes with a slot along supporting legs 50*a*, 50*c* to form a vertical slot. A pin may be extended through the combined vertical slot to provide pivots 104. Panels 56, 58 are configured to rotate inward relative to the adjacent legs 50*a*, 50*c* by exerting pressure from the exterior portion 108 of panels 56, 58. The inner portions of panels 56, 58 each include a slot provided by pivot knuckles 70, 72 that mesh with pivot knuckles 111, 113 of connector 110 to form a combined vertical slot. A pin may be extended through the combined vertical slot to provide pivots points 112*b*, 112*b*. The exerted pressure cause pivots points 112*a*, 112*b* to rotate such that pivots 60, 62 move panels 56, 58 inward. Connector 110 ensures that panels 56, 58 remain connected while rotating inward. Furthermore, connector 110 is shaped such that the edges of panels 56, 58 do not interfere with each other when rotating inward. While only one double pivot 42 is illustrated in FIG. 6*a*, multiple double pivots 42 can be vertically aligned between panels 56, 58.

With reference to FIG. 6*b*, connector 110 offsets pivots 60, 62 of double pivot 42 by a lateral distance that may form a pocket or space therebetween to allow the adjacent inner edges of panels 56, 58 to pivot interiorly such that the exterior faces may position approximately parallel or flush against each other. Additionally or alternatively, the pivot connector 110 connecting the pivots 60, 62 may be offset interiorly from the pivots points 112*a*, 112*b* providing an exteriorly facing pocket through which the adjacent inner edges of panels 22, 24 and panels 56, 58 may translate into while pivoting to the folded position. Pivot connector 110 can include an upper portion 114*a* and lower portion 114*b* such that each portion connects to different positions of pivots points 112*a*, 112*b*. The upper portion 114*a* connects to the lower portion 114*b* by an intervening expanse of material that spaces the upper and lower portions 114*a*, 114*b* apart to allow corresponding intervening pin slots of the pivots 60, 62 to positioned therebetween. Connector 110 ensures that panels 56, 58 remain connected when rotating inward, as illustrated in the isolated view of FIG. 6*b*. The connector 110 has an "I" shape with upper and lower portions 114*a*, 114*b* positioned within gaps of the interfacing "E" shaped pivots 60, 62. In other embodiments, the double pivot 42 may include just an upper or lower portion 114*a*, 114*b* positioned within a gap of interfacing "C" shaped pivots 60, 62. In another example, the pivots 60, 62 may include only a single pin slot that positions with a gap between upper and lower portions 114*a*, 114*b* or merely adjacent to only an upper or lower portion 114*a*, 114*b*. In one example, the connector 110 and pivots 60, 62 include additional meshable or alighnable pin slots, such as 6, 7, 8, 9, 10, or more, on each side. Accordingly, various arrangements or connectors and pivots may be used. With reference to FIG. 6*c*, pivot 104 includes an upper portion 115*b* that connects to panel 58, and lower portion 115*a* that connects to supporting leg 50*a*. The outer portion of panel 58 includes a slot that meshes with a slot along supporting legs 50*a* to form a vertical slot. A pin may be extended through the combined vertical slot to provide pivot 104. Pivot 104 enables inward rotation of panel 58 relative to adjacent leg 50*a*.

With reference to FIGS. 1-5*d*, in order to fold foldable cabinet 2, a user must first remove shelves 30*a*, 30*b*, and top drawer 4 from the interior of the foldable cabinet 2. Applying pressure to the exterior portion 108 of side wall 38 forces the double pivot 42 and pivot 104 to rotate inward in a substantially similar manner as described above and illustrated in FIGS. 5*b*-5*e*. The side wall 28 also folds in a substantially similar manner as side wall 38.

Figure 7:
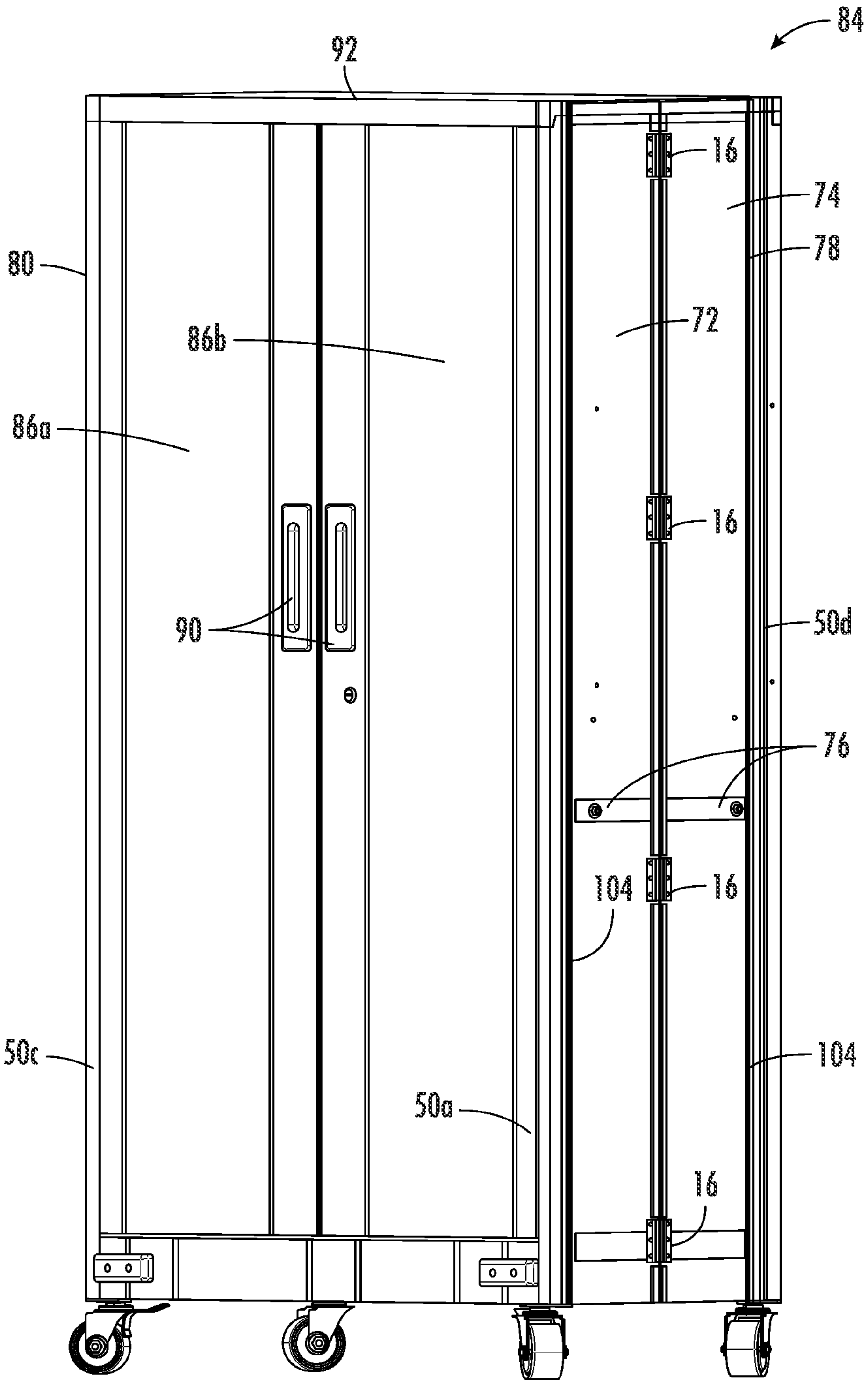
FIG. 7 illustrates a frontal view of a foldable cabinet according to another embodiment.
Figure 8:
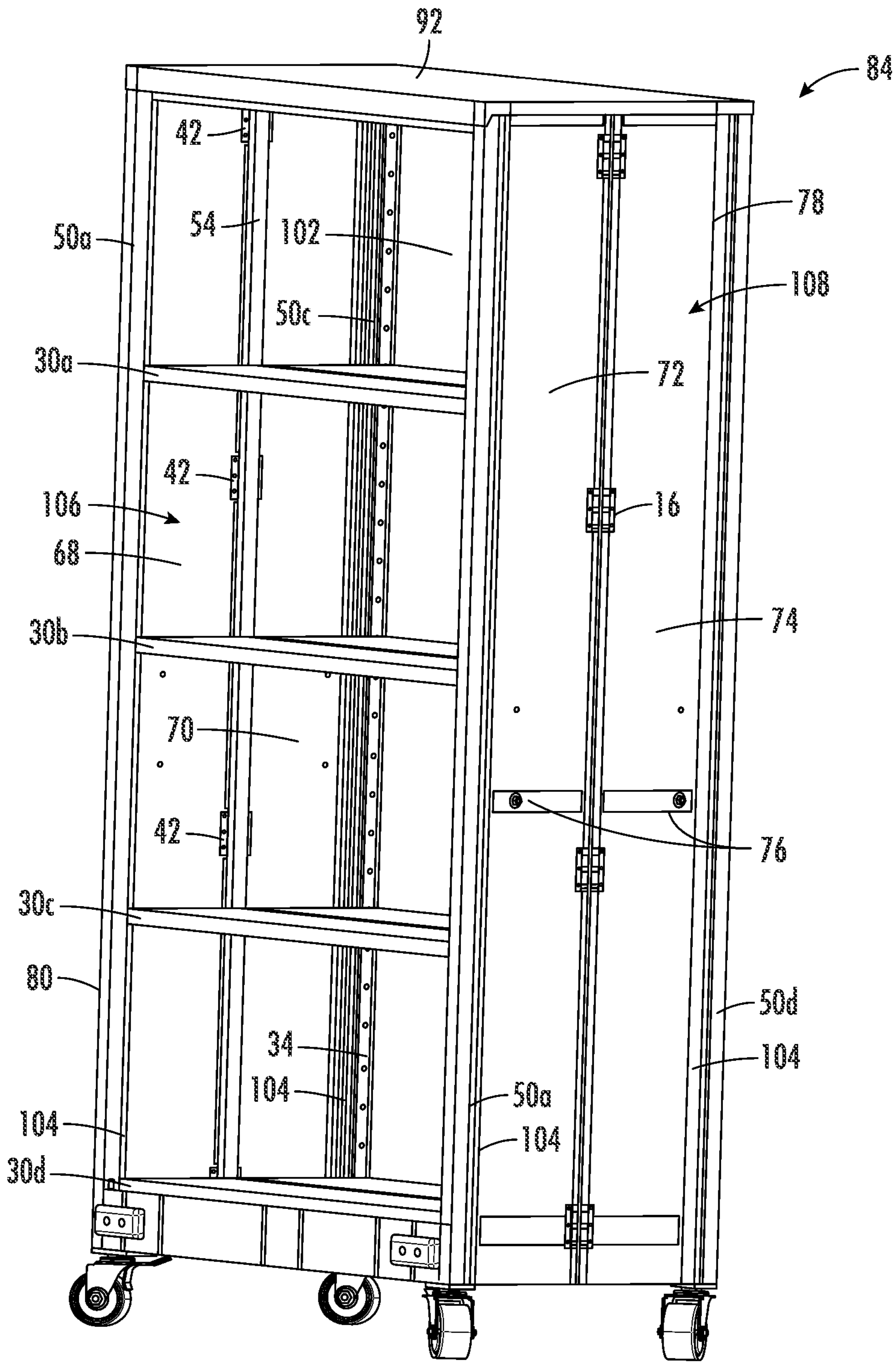
FIG. 8 illustrates a frontal view of the inside of the foldable cabinet without the front cabinet doors according to another embodiment.
Figure 9:
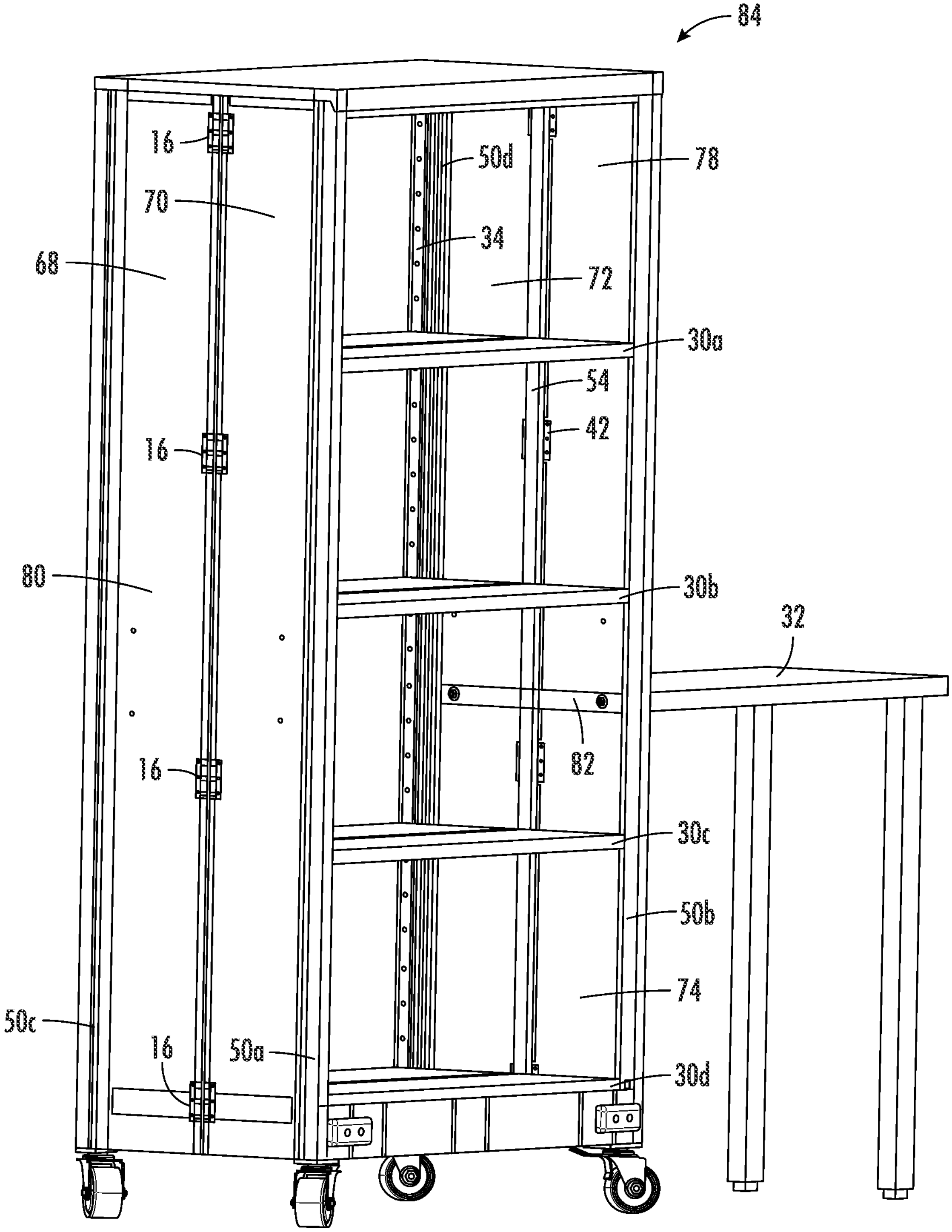
FIG. 9 illustrates a frontal view of the inside of the foldable cabinet with an attached table stand, according to another embodiment.

FIGS. 7-9 illustrate foldable cabinet 84 according to another embodiment. Specifically, with reference to FIG. 7, foldable cabinet 84 includes a removable top cover 92, and cabinet doors 86*a*, 86*b* each with corresponding handles 90. Top cover 92 has substantially similar functions and features as top cover 26. Foldable cabinet 84 also has two substantially similar foldable side walls 78 and 80. Specifically, side wall 78 comprises a side panel 72 connected to side panel 74 by a plurality of vertically positioned double pivots 42 on the interior portion 106 of foldable cabinet 84, as illustrated in FIGS. 8-9. The exterior portion 108 of the foldable side wall 78 is shown in ghost to illustrate connection points 16 with respect to a plurality of double pivots 42 along interior lateral portions of side panels 72, 74 in FIGS. 7-8 and similarly with respect to exterior portion 108 of foldable side wall 80 in FIG. 9. The plurality of double pivots 42 described in this embodiment are substantially similar to the pivots described with and illustrated in FIGS. 1-5*e*. Although pivots 104 are positioned on the interior portion 106 of foldable cabinet 84 and are not visible in FIGS. 7-8, pivots 104 connect first panel 72 to supporting leg 50*a* and second panel 74 to supporting leg 50*d* of foldable cabinet 84.

FIG. 8 illustrates a frontal view of foldable cabinet 84 with the cabinet doors 86*a*, 86*b* removed. Foldable side wall 80 comprises a first and second panel 68, 70 connected to each other by a plurality of vertically positioned double pivots 42. Each of panel 68 and panel 70 have corresponding pivots 104 that connect side panel 72 to supporting leg 50*a*, and side panel 74 to the supporting leg 50*c* of cabinet unit 84. The plurality of double pivots 42 enable side panels 68 and 70 to rotate inward about a vertical axis as illustrated and described above with reference to FIGS. 1-5*e*. Cover 54 ensures that side panels 70 and 68 remain aligned when rotating inward.

Foldable cabinet 84 may include shelves 30*a*-30*d* that are removably attached to the supporting legs 50 by adjustable pins 52 that are inserted to an attachment bracket 34 positioned vertically along each of the supporting legs 50. Other attachment mechanisms known to those skilled in the art can be employed. Although not illustrated, attachment mechanism 34 is also positioned between the side wall 80 and back wall 102, as well as between the side wall 80 and front door 86*a*, and side wall 78 and front door 86*b*. With reference to FIGS. 8-9, table 32 is removably attached to foldable cabinet 2 via bolts 76 and bracket 82, or another attachment mechanism known to those skilled in the art.

To fold foldable cabinet 84, a user may first remove shelves 30*a*-30*d* from the interior of the foldable cabinet 84, top panel 92, and table 32, if attached to foldable cabinet 84. Applying pressure to the exterior portion 108 of side wall 80 forces double pivots 42 and pivots 104 to rotate inward such that the panels 68 and 70 fold into each other. Side walls 78, 80 rotate inward in a substantially similar manner as illustrated in FIGS. 5*b*-5*e*.

This disclosure describes various elements, features, aspects, and advantages of various embodiments of the foldable cabinet 2, 84 and methods thereof. It is to be understood that certain descriptions of the various embodiments have been simplified to illustrate only those elements, features and aspects that are relevant to a more clear understanding of the disclosed embodiments, while eliminating, for purposes of brevity or clarity, other elements, features and aspects.

Any references to "various embodiments," "certain embodiments," "some embodiments," "one embodiment," or "an embodiment" generally means that a particular element, feature and/or aspect described in the embodiment is included in at least one embodiment. The phrases "in various embodiments," "in certain embodiments," "in some embodiments," "in one embodiment," or "in an embodiment" may not refer to the same embodiment. Furthermore, the phrases "in one such embodiment" or "in certain such embodiments," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

What is claimed is:

1. A foldable cabinet, comprising:

a front wall attached to a front proximal supporting leg and a front distal supporting leg, a back wall attached to a back proximal supporting leg and a back distal supporting leg, a first foldable side wall attached to the front proximal supporting leg and the back proximal supporting leg, and a second foldable side wall attached to the front distal supporting leg and back distal supporting leg, wherein the first foldable wall comprises a first panel connected to a second panel by at least a first double pivot connection, wherein the first double pivot connection comprises a first pivot, a second pivot, and a connector that pivotably couples between a first pivot knuckle of the first pivot and a second pivot knuckle of the second pivot, wherein the first and second pivots each comprise a first laterally extending portion, an interiorly extending portion that extends interiorly from the first laterally extending portion to an interior end, and a second laterally extending portion that extends laterally from the interior end of the interiorly extending portion to the respective pivot knuckle, wherein the first laterally extending portion of the first pivot mounts to the first panel and the first laterally extending portion of the second pivot mounts to the second panel, wherein the connector is offset interiorly from the first and second pivot knuckles to provide an exteriorly facing pocket, and wherein the second foldable wall comprises a third panel connected to a fourth panel by at least a second double pivot connection.

2. The foldable cabinet of claim 1, wherein the first pivot of the first double pivot connection connects to the first panel of the first foldable wall and a second side of the first double pivot connection connects to the second panel of the first foldable wall, and wherein a first side of the second double pivot connection connects the third panel of the of the second foldable wall and a second side of the second double pivot connection connects to the fourth panel of the second foldable wall.

3. The foldable cabinet of claim 1, wherein the first panel attaches to the front proximal supporting leg by a first pivot mechanism, the second panel attaches to the back proximal supporting leg by a second pivot mechanism, the third panel attaches to the front distal supporting leg by a third pivot mechanism, and the fourth panel attaches to the back distal supporting leg by a fourth pivot mechanism.

4. The foldable cabinet of claim 1, wherein the first double pivot connection enables inward rotation of the first and second panel of the first foldable wall such that the first and second panel are approximately parallel when in a folded configuration, and wherein the second double pivot connection enables inward rotation of the third and fourth panel of the second foldable wall such that the third and fourth panels are approximately parallel when in the folded configuration.

5. The foldable cabinet of claim 1, wherein the front wall and the back wall are approximately parallel when the first foldable wall and second foldable wall are in the folded configuration.

6. The foldable cabinet of claim 1, wherein a first pivot mechanism is positioned on the first panel and is offset a first distance from the front proximal supporting leg, a second pivot mechanism is positioned on the second panel and is offset a second distance from the back proximal supporting leg, a third pivot mechanism is positioned on the third panel and is offset a third distance from the front distal supporting leg, and a fourth pivot mechanism is positioned on the fourth panel and offset by a fourth distance from the back distal supporting leg.

7. The foldable cabinet of claim 1, wherein the each of the front proximal supporting leg, back proximal supporting leg, front distal supporting leg, and back distal supporting leg each have a vertically aligned attachment mechanism configured to support at least one removable shelf by a plurality of pins extended outward from the removable shelf.

8. The foldable cabinet of claim 1, wherein a drawer has a proximal bracket removably attached to the front proximal supporting leg and the back proximal supporting leg, and a distal bracket removably attached to the front distal supporting leg and back distal supporting leg.

9. The foldable cabinet of claim 1, wherein the first panel and second panel are connected by a plurality of double pivot connections, and the third panel and fourth panel are connected by a plurality of double pivot connections.

10. A method of folding a foldable cabinet, the foldable cabinet comprising a front wall attached to a front proximal supporting leg and a front distal supporting leg, a back wall attached to a back proximal supporting leg and a back distal supporting leg, a first foldable side wall attached to the front proximal supporting leg and the back proximal supporting leg, and a second foldable side wall attached to the front distal supporting leg and back distal supporting leg, wherein the first foldable wall comprises a first panel connected to a second panel by at least a first double pivot connection, wherein the first double pivot connection comprises a first pivot, a second pivot, and a connector that pivotably couples between a first pivot knuckle of the first pivot and a second pivot knuckle of the second pivot, wherein the first and second pivots each comprise a first laterally extending portion, an interiorly extending portion that extends interiorly from the first laterally extending portion to an interior end, and a second laterally extending portion that extends laterally from the interior end of the interiorly extending portion to the respective pivot knuckle, wherein the first laterally extending portion of the first pivot mounts to the first panel and the first laterally extending portion of the second pivot mounts to the second panel, wherein the connector is offset interiorly from the first and second pivot knuckles to provide an exteriorly facing pocket, and wherein the second foldable wall comprises a third panel connected to a fourth panel by at least a second double pivot connection, the method comprising:

applying pressure to an external portion of the first panel or second panel such that the first panel and second panel rotate inward and are approximately parallel when in a folded configuration, and applying pressure to an external portion of one of the third panel or fourth panel such that the third panel and fourth panel rotate inward and are approximately parallel when in a folded configuration.

11. The foldable cabinet of claim 10, wherein the first pivot of the first double pivot connection connects to the first panel of the first foldable wall and a second side of the first double pivot connection connects to the second panel of the first foldable wall, and wherein a first side of the second double pivot connection connects the third panel of the of the second foldable wall and a second side of the second double pivot connection connects to the fourth panel of the second foldable wall.

12. The foldable cabinet of claim 10, wherein the first panel attaches to the front proximal supporting leg by a first pivot mechanism, the second panel attaches to the back proximal supporting leg by a second pivot mechanism, the third panel attaches to the front distal supporting leg by a third pivot mechanism, and fourth panel attaches to the back distal supporting leg by a fourth pivot mechanism.

13. The foldable cabinet of claim 10, wherein the front wall and the back wall are approximately parallel when the first foldable wall and second foldable wall are in the folded configuration.

14. The foldable cabinet of claim 10, wherein a first pivot mechanism is positioned on the first panel and is offset a first distance from the front proximal supporting leg, a second pivot mechanism is positioned on the second panel and is offset a second distance from the back proximal supporting leg, a third pivot mechanism is positioned on the third panel and is offset a third distance from the front distal supporting leg, and a fourth pivot mechanism is positioned on the fourth panel and offset by a fourth distance from the back distal supporting leg.

15. The foldable cabinet of claim 10, wherein the each of the front proximal supporting leg, back proximal supporting leg, front distal supporting leg, and back distal supporting leg each have a vertically aligned attachment mechanism configured to support at least one removable shelf by a plurality of pins extended outward from the removable shelf.

16. The foldable cabinet of claim 10, wherein a drawer has a proximal bracket removably attached to the front proximal supporting leg and the back proximal supporting leg, and a distal bracket removably attached to the front distal supporting leg and back distal supporting leg.

17. The foldable cabinet of claim 10, wherein the first panel and second panel are connected by a plurality of double pivot connections, and the third panel and fourth panel are connected by a plurality of double pivot connections.

18. The foldable cabinet of claim 1, wherein the connector is I-shaped.

19. The foldable cabinet of claim 10, wherein the connector is I-shaped.

* * * * *